April 28, 1925.
G. H. HAYES
PLANT TREATING TRUCK
Filed Feb. 9, 1923
1,536,001
2 Sheets-Sheet 1
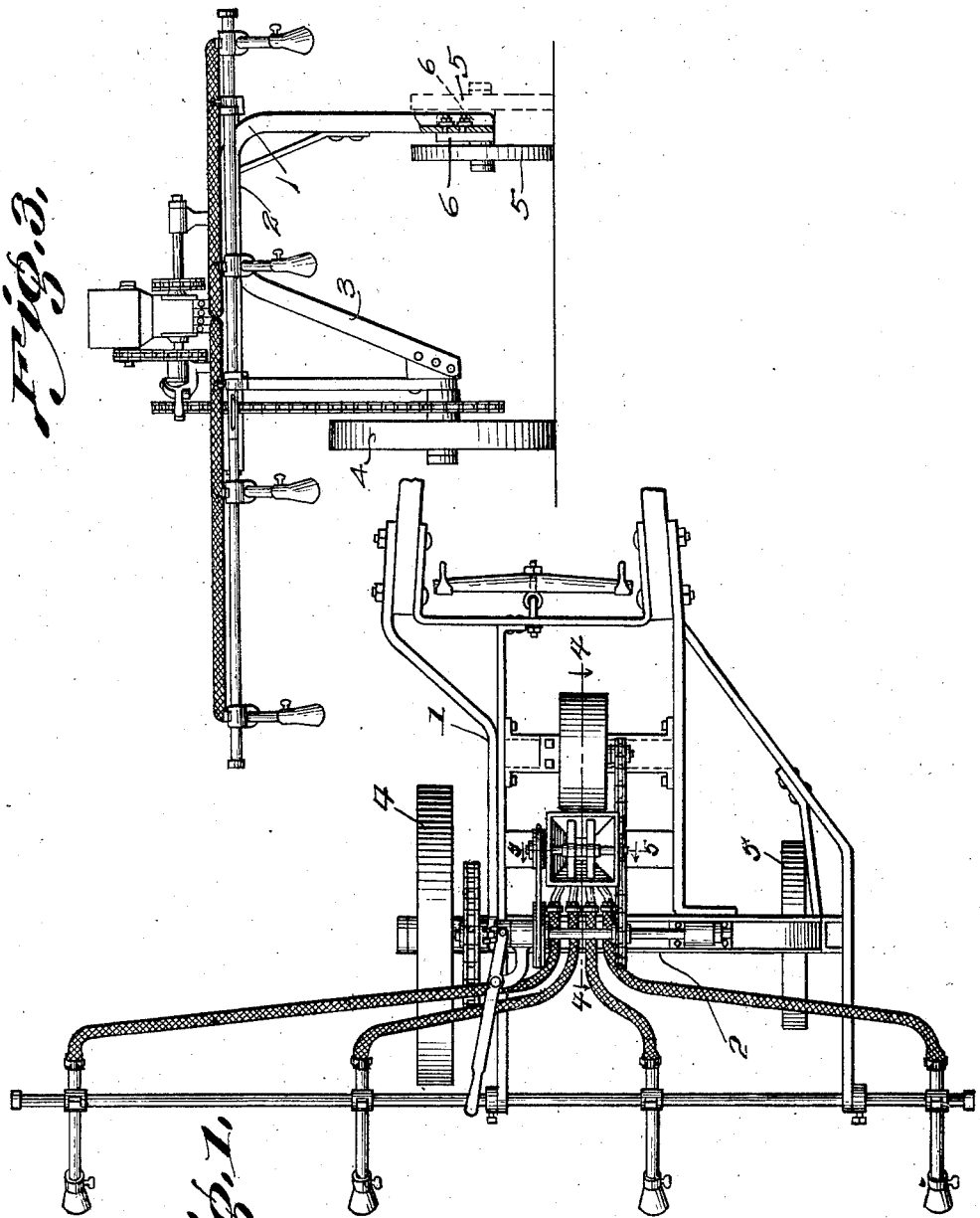
George H. Hayes
INVENTOR
BY Victor J. Evans
ATTORNEY
J. L. Wright.
WITNESS:

April 28, 1925.
G. H. HAYES
1,536,001
PLANT TREATING TRUCK
Filed Feb. 9, 1923
2 Sheets-Sheet 2
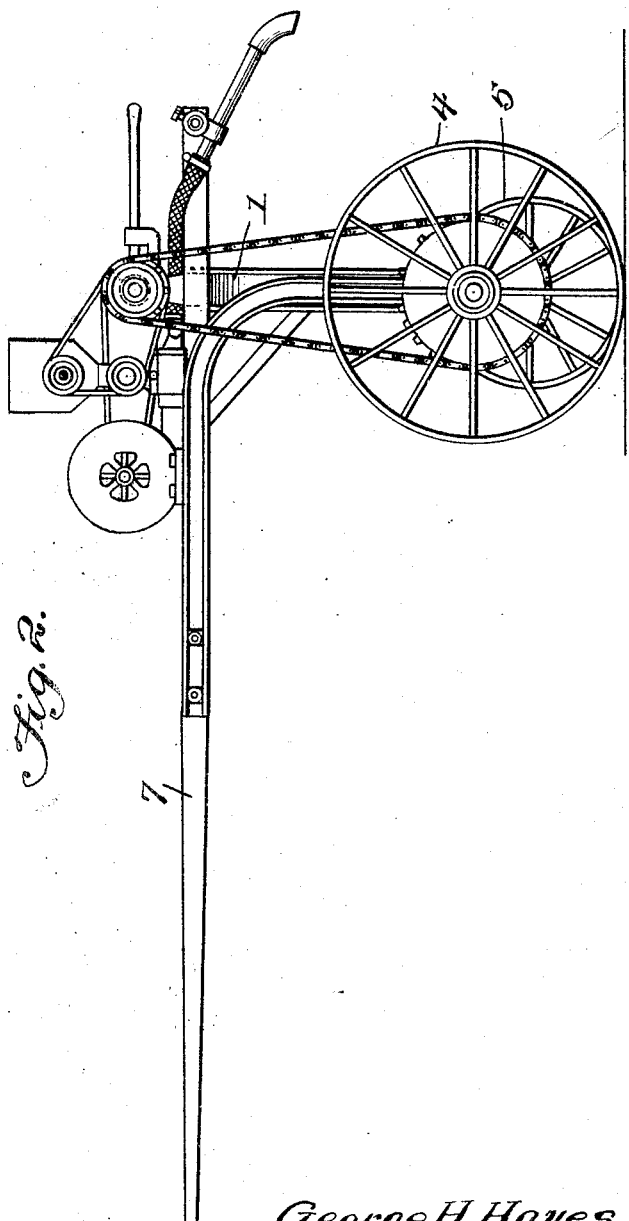

Patented Apr. 28, 1925.

1,536,001

UNITED STATES PATENT OFFICE.

GEORGE H. HAYES, OF ATLANTA, GEORGIA.

PLANT-TREATING TRUCK.

Application filed February 9, 1923. Serial No. 618,074.

*To all whom it may concern:*

Be it known that I, GEORGE H. HAYES, a citizen of the United States, residing at Atlanta, in the county of Fulton and State of Georgia, have invented new and useful Improvements in Plant-Treating Trucks, of which the following is a specification.

This invention relates to a plant treating machine, the general object of the invention being to provide a machine which can be drawn by one horse and which is so formed that the horse will walk between two rows while the machine will straddle a row so that several rows of plants can be treated at one time.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the device.
Figure 2 is a side view thereof.
Figure 3 is a view of the rear end.

In these views 1 indicates the frame of the machine which includes an arch 2 which is provided with an inclined leg 3 to which the spindle of the large wheel 4 is connected. The spindle of a small wheel 5 is connected with the other limb of the arch by a block 6 which is bolted to the arch in such a manner that the block may be secured to the outer face of the limb of the arch so as to make the wheels adjustable for different widths of rows. The shafts 7 are so arranged that the horse will walk in the space between two rows of plants with the large wheel in the same space while the small wheel is in the next space with the arch spanning a row of plants. While the machine can be used for supporting means for treating plants in various ways the drawing shows it as supporting a dusting machine.

With my invention the device can be pulled by a single horse or mule and the animal will walk in the space between two rows while the implement straddles a row so that several of the rows will be treated at the same time.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A plant treating machine comprising a frame including an arch having one of its legs inclinedly arranged, wheels carried by the arch, shafts connected with the front of the frame to one side of the center thereof, and means provided for placing one of the wheels on the inner or outer face of one of the limbs of the arch.

In testimony whereof I affix my signature.

GEORGE H. HAYES.